Figure 1:
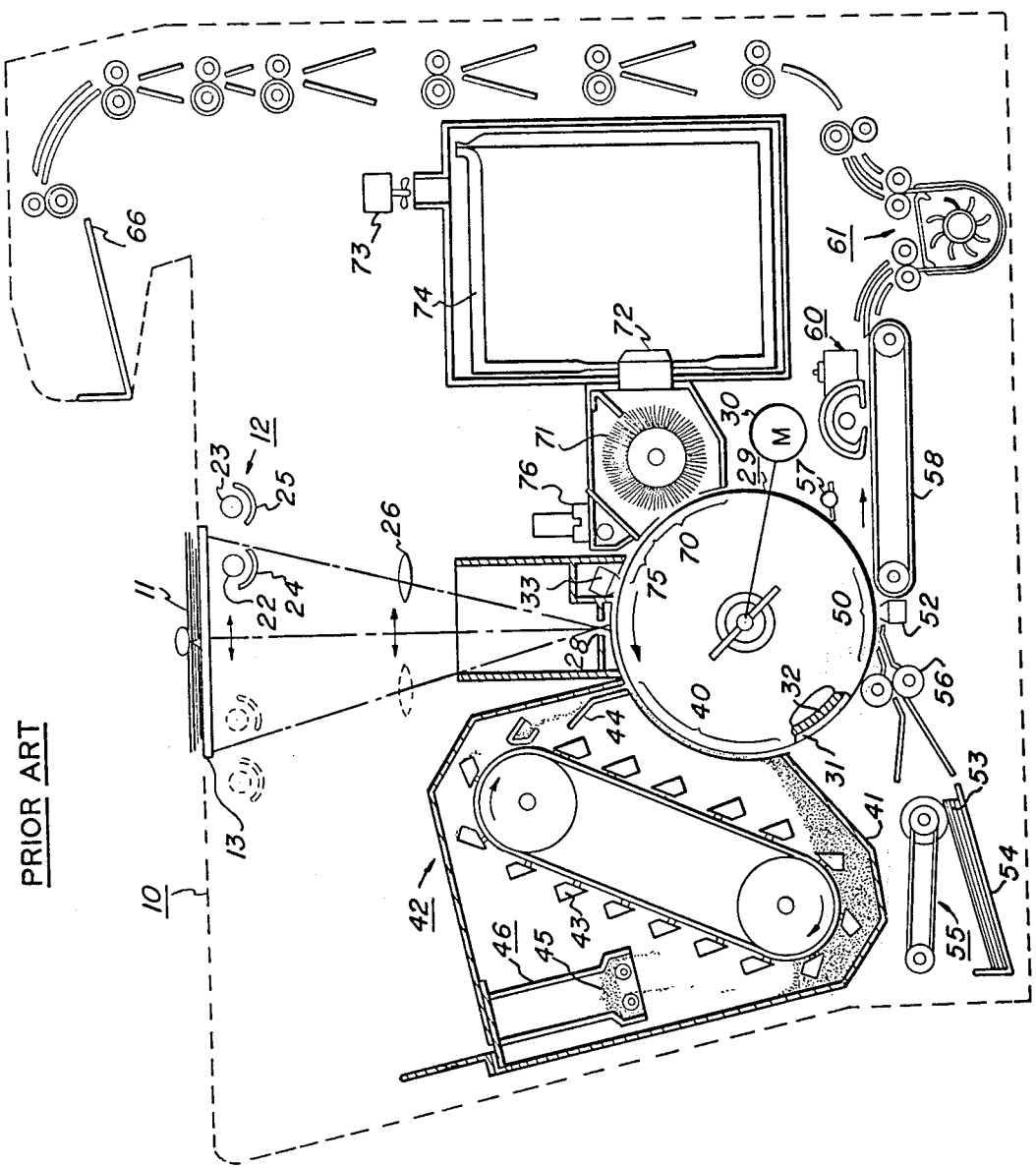

United States Patent [19]
Brooke

[11] 3,950,091
[45] Apr. 13, 1976

[54] APPARATUS FOR CONTROLLING MOVEMENT OF A CARRIAGE

[75] Inventor: Edric Raymond Brooke, Welwyn Garden City, England

[73] Assignee: Xerox Corporation, Stamford, Conn.

[22] Filed: Feb. 25, 1974

[21] Appl. No.: 445,527

[30] Foreign Application Priority Data
Mar. 1, 1973 United Kingdom............... 9984/73

[52] U.S. Cl. ..................................... 355/8; 355/84
[51] Int. Cl.² ........................................ G03G 15/28
[58] Field of Search ............. 355/8, 84, 65, 66, 11, 355/67, 70

[56] References Cited
UNITED STATES PATENTS

| | | | |
|---|---|---|---|
| 2,760,419 | 8/1956 | Gelb | 355/84 |
| 3,512,886 | 5/1970 | Wirley et al. | 355/8 X |
| 3,652,156 | 3/1972 | Lahr et al. | 355/8 |

*Primary Examiner*—Fred L. Braun

[57] ABSTRACT

A carriage drive apparatus comprising a carriage, a drive mechanism to drive the carriage in one direction, a shaft rotatable at a constant speed, an overrunning clutch mounted on the shaft, and at least one lever connecting the clutch and the carriage, the lever pivoting about the shaft. The arrangement is such that on movement of the carriage in the one direction, the lever is moved, but is prevented from rotating about the shaft at greater than the given speed by the overrunning clutch. A plurality of levers may be employed. The apparatus is particularly useful for providing controlled deceleration during the return scan of a scanning lamp carriage of a reproducing machine.

8 Claims, 5 Drawing Figures

APPARATUS FOR CONTROLLING MOVEMENT OF A CARRIAGE

This invention relates to apparatus for controlling movement of a carriage.

Photocopying machine such as those described in U.S. Pat. No. 3,062,109 contain a carriage for lamps which expose successive portions of a document to the photosensitive surface. The lamps are scanned across the document slowly, and are then quickly returned to their start position at the end of the scanning stroke. Filament lamps, especially when hot, are very delicate, and sensitive to accelerations. Normally, the carriage is driven in one direction by means of a cable connected to the main drive of the machine through a clutch, and is returned when the clutch is de-energized under the influence of a spring. At the end of the return stroke the carriage collides with a buffer. Various means have been used to soften the collision, for example, air vanes driven by the movement of the carriage which act as a governor, or a hydraulic dash pot.

U.S. Pat. No. 3,554,640 discloses a drive system for the lamp carriage of a copying machine in which movement of the carriage is closely controlled in the forward and return directions. In the return direction, the movement of the carriage is controlled by means of a capstan with variable radius portions whose maximum speed of rotation is controlled by an overrunning clutch on a constantly rotating shaft. The mechanical connection between the carriage and the constantly rotating shaft includes two sets of cables, a pair of gears and the capstan with sections of varying radius. The present invention simplifies this arrangement in that a number of levers is connected between the carriage and the constantly rotating shaft to control the motion of the carriage according to the speed of the shaft.

According to the invention there is provided a carriage drive assembly comprising a carriage, drive means to drive the carriage in one direction, a shaft rotatable at a constant speed, an overrunning clutch mounted on the shaft, and at least one lever connecting the clutch and the carriage, the arrangement being such that on movement of the carriage in said one direction, the lever is moved but is prevented from rotating about the shaft at greater than said given speed by the overrunning clutch.

Biased means may be provided to bias the lever into contact with the carriage, the lever being movable against its bias on movement of the carriage in said one direction. Preferably a plurality of levers are provided, the biasing means being arranged to bias one lever into contact with the carriage and succeeding levers into contact with the preceding lever, the last lever being mounted by the overrunning clutch on the shaft. The choice of the number of levers will be governed by the shape of the space available for movement of the lever as the carriage moves in said one direction.

Figure 2:
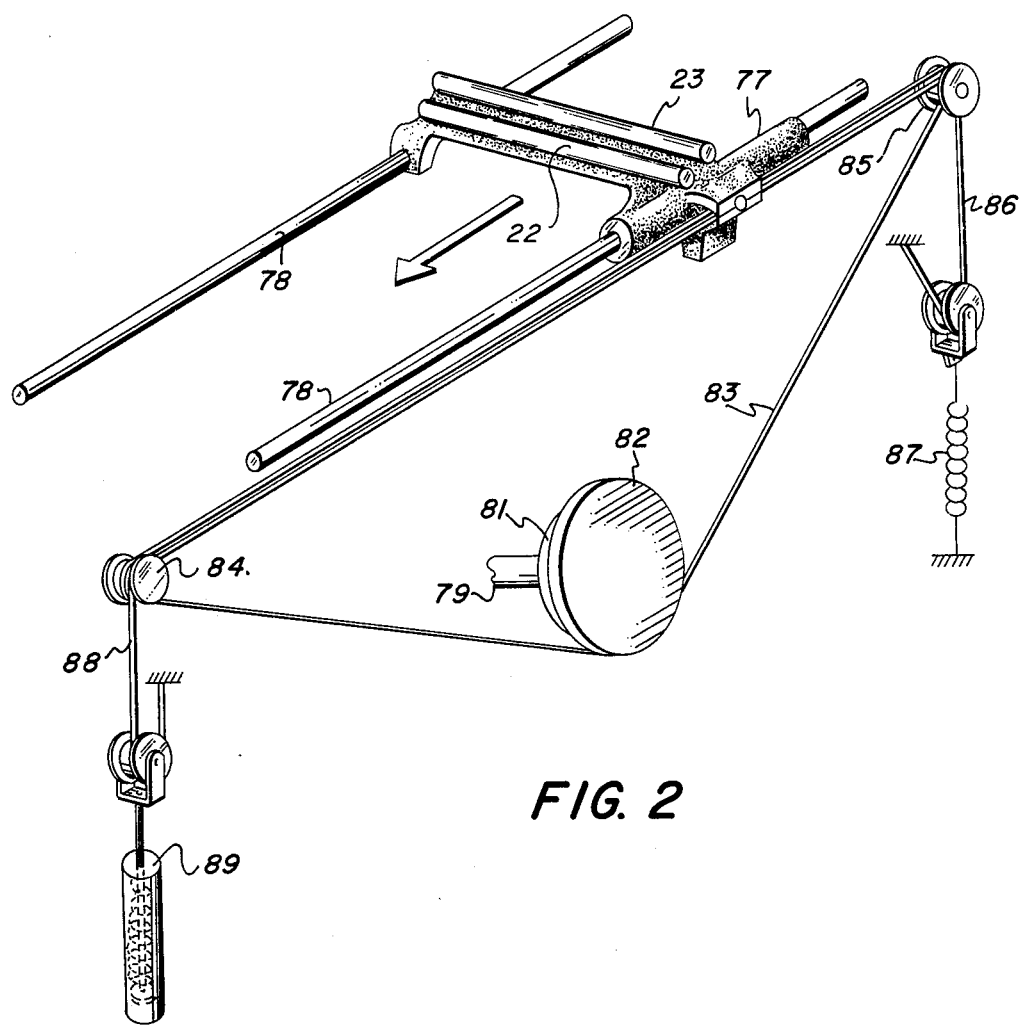
Figure 3:
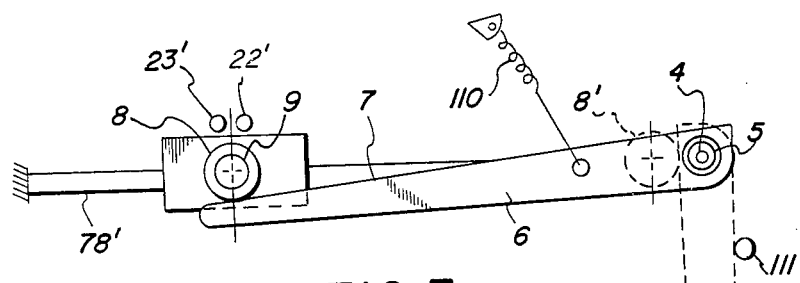
Figure 4:
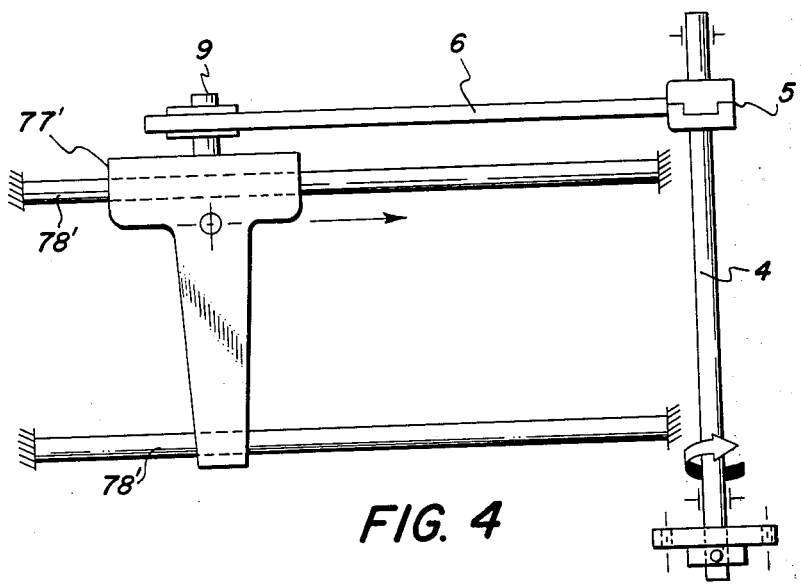
Figure 5:
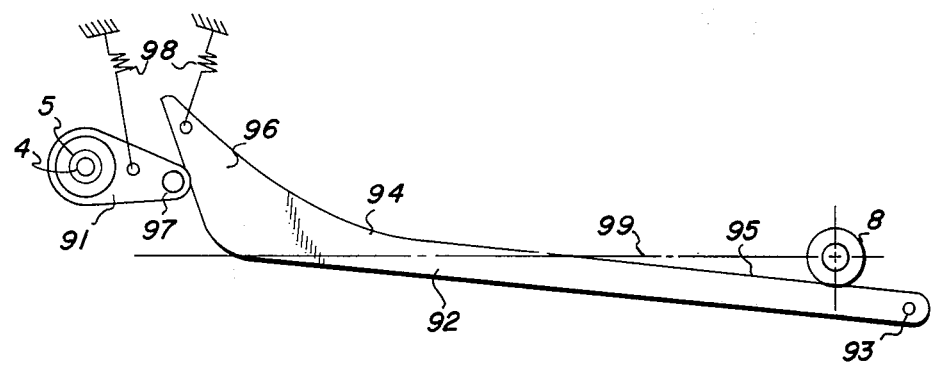

Examples of the invention will now be described with reference to the accompanying drawings in which:

FIG. 1 is a schematic section elevation of photocopying apparatus incorporating a conventional document scanning system, FIG. 2 shows a conventional carriage drive system using a known dashpot and does not form part of the present invention, FIG. 3 is an elevation of a carriage drive control assembly using a simple lever, FIG. 4 is an underplane view of the apparatus of FIG. 3, and FIG. 5 is a schematic diagram of a carriage drive control assembly using two levers.

For a general understanding of the xerographic processing system reference is made to FIG. 1 in which the various system components are schematically illustrated.

It should be understood that xerographic machines can include other forms of these components. The xerographic apparatus described herein may be an adaptation of the type disclosed in Eichler et al, U.S. Pat. No. 2,945,434. As in all xerographic systems based on the concept disclosed in U.S. Pat. No. 2,945,434, a radiation image of copy to be reproduced is projected onto the sensitized surface of a xerographic plate forming an electrostatic latent image thereon. Thereafter, the latent image is usually developed with an electroscopically charged developing material to form a xerographic powder image, corresponding to the latent image on the plate surface. The developed image is then transferred to a support surface to which the image is permanently affixed by means of a fuser apparatus.

As shown in FIG. 1 there is illustrated a light-tight cabinet 10 for enclosure and containment of all the operative components. Copy to be reproduced, such as a book, sheet or the like, here designated 11, is supported at a copy station 12. The copy station includes a horizontally arranged transparent platen support 13 such as glass, on which the copy rests in position to be optically scanned. Projection of the copy image is achieved by means of a scanning mechanism that in this embodiment includes a pair of transversely extending fluorescent lights 22 and 23 that are adapted to move horizontally from the position shown solid to the position shown dashed as more fully described in the above-cited Eichler patent. Light shields 24 and 25 prevent stray light from being transmitted from the lamps other than that which is utilized for illuminating the copy above. An image of the illuminated copy is reflected through objective lens 26, which moves horizontally in conjunction with the lamp, for projecting an image downwardly through an aperture slit 28 and onto the surface of a xerographic plate which in this embodiment is in the form of rotating drum 29.

Xerographic drum 29 includes a cylindrical member mounted in suitable bearings in the frame of the machine and is driven in a counterclockwise direction by a motor 30 at a constant rate that is proportional to the scanning rate of the copy, whereby the peripheral rate of the drum surface is identical to the scan rate of the reflected light image. The drum surface comprises a layer of photoconductive insulating material 31, which may, for example, be vitreous selenium, supported on a conductive backing 32, such as aluminum. Prior to exposure, the drum surface is sensitized by means of a corona generating device 33, which may be an adaptation of the type disclosed in Vyverberg U.S. Pat. No. 2,965,756 and which is energized from a suitable high potential source (not shown).

The exposure of the drum to the light image discharges the photoconductive layer in the areas struck by light, whereby there remains on the drum a latent electrostatic image in image configuration corresponding to the light image projected from the copy. As the drum surface continues its movement the electrostatic latent image passes through a developing station 40 in which a two-component (toner and carrier) developing material 41, which may be the type disclosed in U.S. Pat. No. 2,638,416 is cascaded over the drum surface by means of a developing apparatus 42.

In the developing apparatus, the two-component developing material 41 is carried upwardly by conveyor 43 driven by suitable drive means and released onto chute 44 wherefrom it cascades down over the drum surface effecting development of the latent image thereon. Toner component 45 of the developer that is consumed in developing is stored in dispenser 46 and is released in amounts as controlled by the dispensing mechanism.

After developing, the powder image passes through an image transfer station 50 at which the powder image is transferred by means of a second corona generating device 52 mentioned above, to a sheet of copy paper 53. The copy sheets are arranged in stack form on a supply tray 54 and are fed therefrom individually by means of a mechanical feeder 55 adapted to feed the top sheet of the stack through driven feed rollers 56 which direct the sheet material into contact with the rotating drum in coordinated registration with the arrival of the developed image at the transfer station.

Following transfer, a pick-off mechanism 57 ensures removal of the copy sheet from the drum surface wherefrom the copy sheet is directed onto an endless conveyor 58 whereby the copy sheet is carried past the fusing and cleaning devices of the invention respectively and designated as 60 and 61. The image is permanently affixed thereat by the fuser onto the copy sheet. Thereafter, the finished copy passes through further feed rolls into a vertical conveying system by means of which the copy is delivered to a copyholder 66 supported along the top portion of cabinet 10 from where it may conveniently be removed by an operator.

After transfer, the xerographic drum surface passes through a cleaning station 70 at which the surface is brushed by cleaning brush assembly 71, whereby residual developing material remaining on the drum surface is removed.

The powder removed from the drum surface is exhausted through port 72 by means of suction provided from fan 73 and becomes lodged in a removable filter bag 74. The drum surface then passes through a discharge station 75 at which it is illuminated by a fluorescent lamp 76 whereby the drum surface in this region is completely flooded with light to remove any electrostatic charge that may remain thereon. Suitable light traps are provided in the system to prevent any light rays from reaching the drum surface other than the projected image, during the period of drum travel immediately prior to sensitization by corona generating device 33 until after the drum surface is completely passed through the developing station 40.

FIG. 2 shows a drive assembly for the lamps 22, 23 of FIG. 1. A carriage 77 for the scanning lamps 22, 23 moves along parallel rails 78 below the platen 13 (not shown in FIG. 2).

The carriage 77 is driven in the scanning direction from the main drive shaft 79 of the copying machine through a clutch 81 on the output side of which is mounted a pulley 82. An endless cable 83 passes over the pulley 82 and over idler pulleys 84, 85 at either end of the carriage path, and the cable is connected to one side of the carriage. When the clutch 81 is energized, the main drive shaft 79 of the copying machine drives the pulley and the cable 83 to cause the lamp carriage 77 to move along the rails 78. A second cable 86 is attached to the lamp carriage 77 which passes over the pulley 85 at the start of scan end of the carriage scan path and stretches a tension spring 87 as the carriage moves in its scan direction. A third cable 88 extends from the lamp carriage in the direction opposite to the second cable and passes over the idler pulley 84 at the end-of-scan position to drive a conventional dash pot 89. The dash pot is designed to prevent any sudden accelerations of the carriage in its return direction.

When the clutch 81 is disengaged, the tension spring 87 takes over the drive of the lamp carriage and causes it to return towards its start-of-scan position, but with an acceleration controlled by the dash pot 89. Unless the tension of the spring 87 reduces to a small amount towards the end of the return stroke, there will still be a sudden deceleration of the carriage when it reaches the end of the return stroke, and the present invention is designed to avoid this deceleration.

In FIG. 4, the carriage 77, for lamps 22', 23' parallel rails 78' as in FIG 2. A spring force S as in FIG. 2, is applied to the carriage to control its return stroke, but in place of the third cable 88 and the dash pot 89 of FIG. 2, there is provided a constantly rotating shaft 4 on which is mounted a lever 6 by means of an overrunning clutch 5. On the side of the carriage, a roller 8 is mounted on a shaft 9, the roller 8 engaging a straight edge of the arm 6.

The shaft 4 rotates in the anti-clockwise direction as seen in FIG. 3 and the overrunning clutch 5 prevents the arm 6 from rotating in the anti-clockwise direction at a greater angular velocity than that of the shaft.

As the spring force S forces the carriage 77' towards the right hand side along the rails 78', the roller 8 will drive the arm 6 in the anti-clockwise direction as seen in FIG. 3 against the bias of the spring 110. The overrunning clutch 5 prevents the arm 6 rotating at a greater angular velocity than the shaft 4, so that the speed and acceleration of the carriage is controlled by the geometry of the arm 6.

The carriage will accelerate quickly at the start of the return stroke under the influence of the spring force S, but as it approaches the end of the return stroke (the roller 8 being shown in chain dotted lines) its velocity has been reduced to a small amount by the larger inclination of the lever 6 to the rails 78'.

A stop 111 prevents rotation of the arm 6 beyond the position shown in chain dotted lines in FIG. 3.

On the scan stroke the spring 110 will return the lever 6 to the position shown in full lines in FIG. 3, keeping the arm 6 in contact with the roller 8, since the overrunning clutch 5 does not prevent motion of the lever 6 in this direction.

It will be seen that the shaft 4 is level with the roller 8 on the carriage, so that the velocity of the roller 8 in the direction of the rails will decrease smoothly to zero during the return stroke as the arm 6 reaches the position shown in chain-dotted lines against the stop 111. If the roller 8 were located below the position shown, there would be a sharp deceleration as the arm 6 strikes the stop 111. The edge 7 of the arm 6 which engages the roller 8 is straight throughout the length of the arm 6.

In FIG. 5, a double lever assembly is provided between the roller 8 on the carriage and the overrunning clutch 5 on the shaft 4. In this arrangement, a short lever 91 is provided on the shaft 4 with a bearing boss 97 at its free end. A second lever 92 is pivoted about an axis 93 adjacent the start of the return stroke with an edge 94 which in a position of the lever shown in FIG. 5, extends across the path 99 of the roller 8. The edge starts straight (95), curving across the path of the roller 8 towards the other end 96 of the lever remote from the axis 93. This arrangement ensures the velocity of the lever 92 towards the end of its stroke. The other end 96 of the level has a straight edge on the side opposite to the curved edge which straight edge engages the boss 97 on the first lever 91. Springs 98 are provided for each lever to bias the first lever 91 into contact with the second and the second lever 92 into contact with the roller 8.

As the carriage moves along its return stroke, the levers 91, 92 are moved against the bias of springs 98 and the velocity of the carriage is limited by the overrunning clutch 5 on the shaft 4. The advantage of the arrangement of FIG. 5 is that the long level 92 does not rotate through so large an angle, so that the apparatus does not require such a large volume to contain the path of the lever as is required in FIG. 3.

The constantly rotating shaft 4 is driven from a separate motor from the motor 30 (Figure 10 which drives the xerographic drum 29. This independent drive prevents the pressure of the lever 6 or the lever 91 on the shaft 4 from affecting the speed of rotation of the drum. If the drum speed varies, the image reproduced will be distorted.

The above-noted patents are intended to be incorporated by reference into this application.

It is apparent that there has been provided in accordance with this invention an apparatus for controlling movement of a carriage which fully satisfies the objects, means and advantages set forth hereinbefore. While the invention has been described in conjunction with specific embodiments therefore, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:
1. A carriage drive apparatus comprising:
    a carriage;
    drive means to drive the carriage in one direction;
    a shaft rotatable about an axis at a given speed and in a given direction;
    at least one lever arranged to rotate about said axis, said lever contacting said carriage so that said lever is rotated about said axis in said given direction as said carriage is moved in said one direction; and
    means for preventing said lever from rotating about said axis in said given direction at a greater angular velocity than said shaft, said preventing means comprising an overrunning clutch mounted to the shaft and connected to said lever.
2. An apparatus as claimed in claim 1 including biasing means to bias the lever into contact with the carriage.
3. An apparatus as claimed in claim 2 wherein said carriage comprises a scanning lamp carriage of a reproducing machine and wherein said one direction comprises the return stroke of said carriage.
4. An apparatus as claimed in claim 2, wherein said lever has an edge which contacts said carriage, said edge being straight.
5. A carriage drive apparatus comprising:
    a carriage;
    drive means to drive the carriage in one direction;
    a shaft rotatable about an axis at a given speed and in a given direction;
    a plurality of lever, one of said levers being arranged to rotate about said axis;
    means for biasing another of said levers into contact with said carriage;
    means for contacting said one lever by said another lever so that said one lever is rotated about said axis in said given direction as said carriage is moved in said one direction;
    and means for preventing said one lever from rotating about said axis of said shaft in said given direction at a greater angular velocity than said shaft, said preventing means comprising an overrunning clutch mounting said one lever on said shaft.
6. An apparatus as claimed in claim 5, wherein said carriage comprises a scanning lamp carriage of a reproducing machine and wherein said one direction comprises the return stroke of said carriage.
7. An apparatus as claimed in claim 5, wherein said another lever has an edge which contacts said carriage, said edge having at least a straight portion.
8. An apparatus as claimed in claim 7, wherein said edge further includes a curved portion.

* * * * *